United States Patent [19]

Hankey et al.

[11] Patent Number: 4,602,611
[45] Date of Patent: Jul. 29, 1986

[54] SNUFFER FOR KITCHEN FIRES

[76] Inventors: Dana L. Hankey, 102 Biddle Dr., Exton, Pa. 19341; John Lewis, Jr., Box 85-1, R.D. #1, Schickshinny, Pa. 18655

[21] Appl. No.: 776,639

[22] Filed: Sep. 16, 1985

[51] Int. Cl.⁴ .......................... A47J 27/00; A62C 7/00
[52] U.S. Cl. ..................................... 126/390; 169/50; 431/144; 126/373
[58] Field of Search .............. 126/390, 373, 220, 221, 126/229 C; 431/144; 220/88 A, 88 R; 169/46, 52, 65, 51, 91, 49, 50

[56] References Cited

U.S. PATENT DOCUMENTS

| | | | |
|---|---|---|---|
| 1,238,583 | 8/1917 | Shving | 169/50 |
| 1,708,553 | 4/1929 | Reams | 169/50 |
| 2,720,269 | 10/1955 | Diacos | 169/50 |
| 3,093,193 | 6/1963 | Schantz | 169/49 |
| 3,283,826 | 11/1966 | Padellford | 169/49 |
| 4,433,733 | 2/1984 | Cunningham | 169/49 |
| 4,483,314 | 11/1984 | Parker et al. | 169/65 X |

FOREIGN PATENT DOCUMENTS 795757 3/1936 France .................................. 169/50

Primary Examiner—Randall L. Green
Attorney, Agent, or Firm—Richard L. Hansen

[57] ABSTRACT

A hand-held snuffer for extinguishing a fire in a vessel, such as a kitchen pan, which includes a soft, compressible, resilient, nonflammable mat, means to support the mat to present a substantially flat, flame-contacting face, and means for grasping the supported mat and laying it on the flaming vessel.

19 Claims, 4 Drawing Figures

U.S. Patent  Jul. 29, 1986  4,602,611
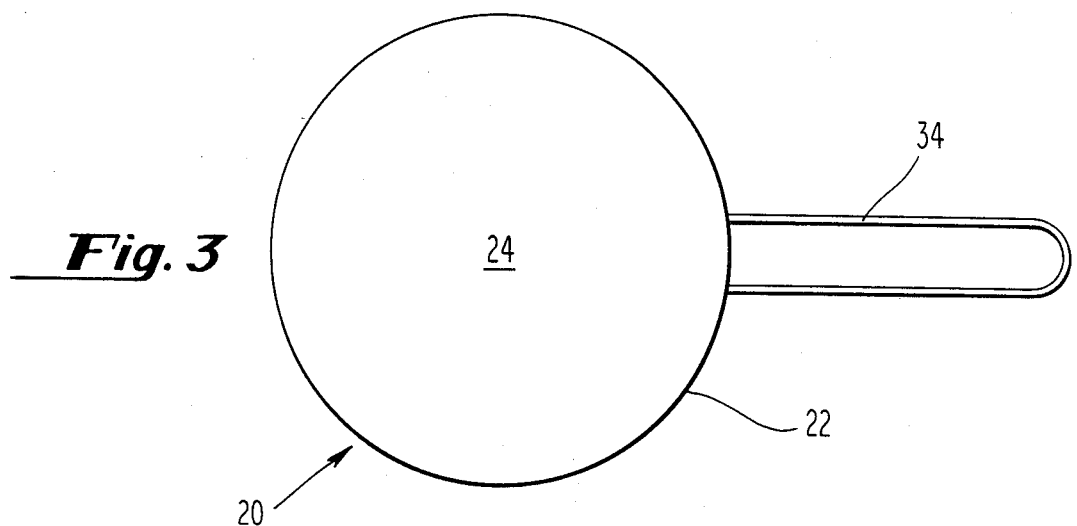
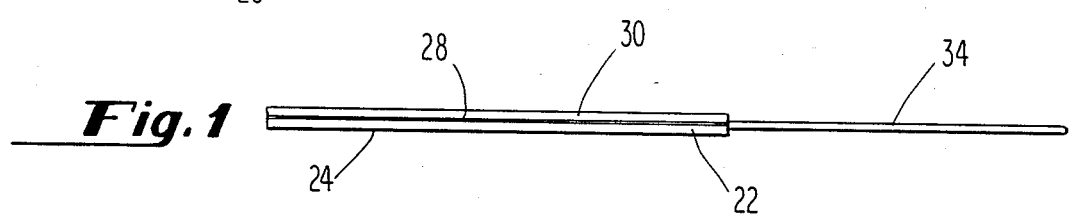
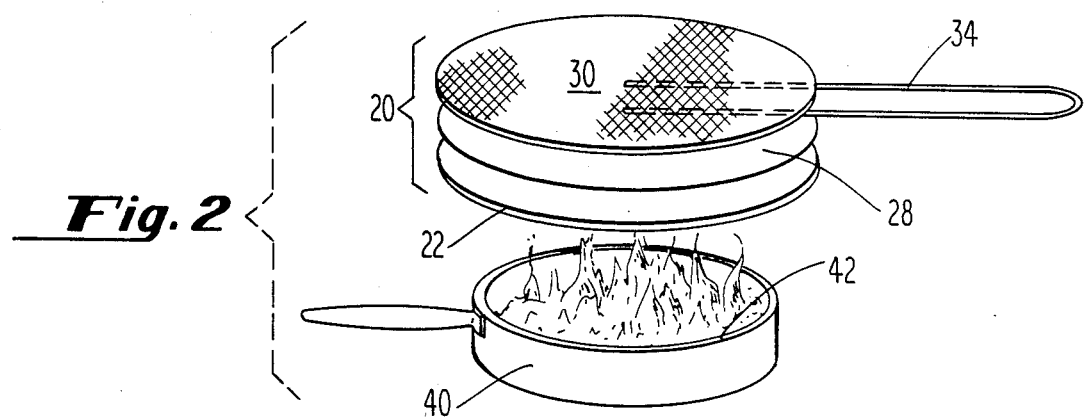
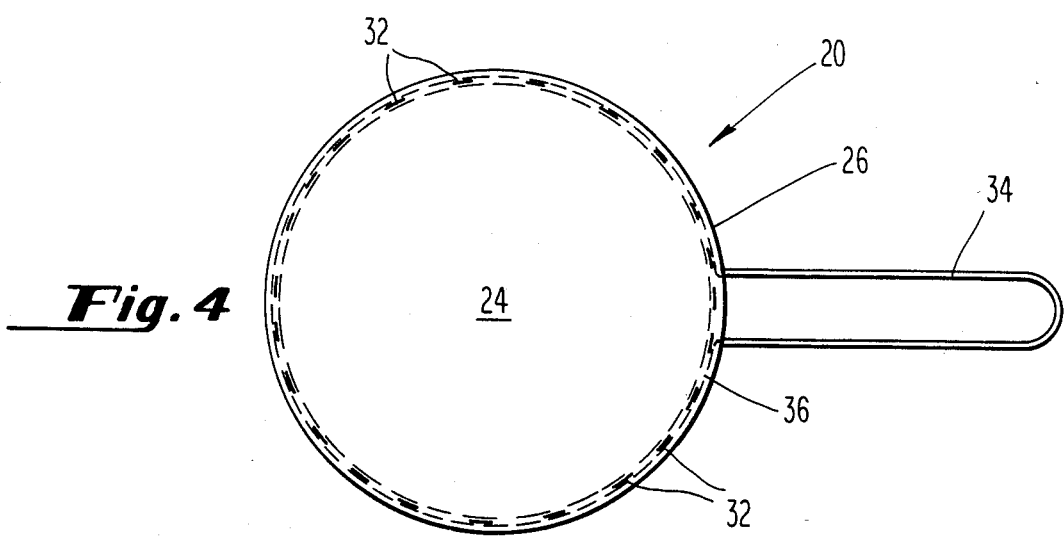

SNUFFER FOR KITCHEN FIRES

This invention is in the field of fire extinguishers; more specifically, hand-held apparatus for fighting a fire in a vessel by snuffing it out.

Many fires in pots, pans, or other vessels occur in, on, or about the stove in the kitchen of a home. Such fires typically start in a pan containing overheated oil or grease. Attempts by the housewife to extinguish this type of fire by removing the pan from the stove, pouring water on the fire, or flailing the flames with articles at hand can turn a relatively minor problem into a disaster.

Most kitchen fires of this type could be put out quickly, safely, and easily by simply excluding the oxygen required to sustain combustion. Unfortunately, an implement capable of safely performing that function is seldom available at the site of the fire.

Thus, it is one object of this invention to provide fire extinguishing apparatus which is simple, safe, effective, and readily available near the stove for instant use in the event of such a fire. It is another objective to provide fire extinguishing apparatus which is at least unobtrusive, but may also be attractive, even decorative, in order to complement the kitchen furnishings when not in use. Other objectives will become apparent hereinafter.

These objectives are attained, according to this invention, in a hand-held snuffer which includes a nonflammable supported mat sized to cover the flaming vessel and means for placing the mat on the vessel to exclude air therefrom. This invention also includes the method of snuffing a fire in a vessel by providing the aforesaid snuffer, grasping it with one hand, and laying it on the vessel.

It is known in the art of fire extinguishers to provide a nonflammable asbestos mat as part of a flail or sled for fighting grass fires; e.g., U.S. Pat. Nos. 1,238,583 and 1,708,553, respectively. U.S. Pat. No. 3,093,193 describes a "smother-type" fire extinguisher adapted to put out the coals in an outdoor barbecue grill, and U.S. Pat. No. 3,283,826 discloses a fire cup of asbestos useful in smothering small laboratory fires. Fires in oil tanks can be controlled with the snuffer described in U.S. Pat. No. 4,433,733. A state-of-the-art fire extinguisher for a kitchen stove is disclosed in U.S. Pat. No. 4,483,314, i.e., a flame-retardant blanket stored in the stove, which may be pulled out and draPed over any fire that occurs.

The differences which distinguish the snuffer of the instant invention from the fire extinguishers of the prior art will be clarified by reference to the drawings which accompany this specification and the detailed description which follows.

IN THE DRAWINGS

FIG. 1 is a side view showing one embodiment of the snuffer of this invention.

FIG. 2 is an exploded perspective view of the snuffer of FIG. 1 being laid on top of a fire in a pan.

FIG. 3 is a bottom view of the snuffer of FIG. 1.

FIG. 4 is a bottom view of another embodiment of the snuffer of this invention.

Referring now to the drawings, hand-held snuffer 20 includes nonflammable mat 22, which is sized to cover the top of vessel 40, flame-contacting face 24 being adapted to rest against edge 42 to seal oxygen from entering the vessel when the snuffer is used. To effect the seal, the mat is soft, compressible, and resilient, in addition to being nonflammable. In order to present a substantially flat, flame-contacting face, the snuffer also includes means for supporting the mat. Depending upon the specific supporting means employed, it may be desirable that the mat be a good thermal insulator, in addition to its other qualities.

Mat 22 is supported in such a way that flame-contacting face 24 is unencumbered, permitting contact with edge 42 to be readily achieved. To effectively snuff a fire it is necessary, not only that flame-contacting face 24 rest against edge 42, but that the supported mat have an oxygen permeability insufficient to support combustion. The snuffer also includes means for grasping the supported mat and laying it on the vessel.

Several different materials are suitable for use in mat 22. These materials include naturally-occurring, fibrous silicates, such as asbestos. In addition, various man-made textiles, woven or nonwoven, felt, cloth or wool, are suitable. These textile materials include carbon, graphite and refractory metal oxides. Examples of the latter are the oxides of zirconium, yttrium, tantalum, hafnium, titanium, aluminum, and cerium. In addition, metal wool, such as steel wool, and high temperature glass wool or fiber, are satisfactory. All of the aforesaid materials are commercially available. In the interests of safety, availability, and efficiency, a man-made textile material is preferred, and carbon felt is especially desirable because of its relatively low cost and availability. The mat optionally may be treated with an antidusting composition.

Various means are available for supporting mat 22 to present substantially flat, flame-contacting face 24. One such means is illustrated by the embodiment shown in FIGS. 1-3, another in the embodiment of FIG. 4.

The mat can be provided, opposite face 24, with a stiff backing. In this context "stiff" means capable of supporting the mat. A number of backing types will suffice, and the backing can be continuous or discontinuous, such as screen; the requirements are that the backing support the mat to present a substantially flat, flame-contacting face and that the supported mat have an oxygen permeability insufficient to sustain combustion. Thus, stiff, continuous backing 30 illustrated in FIGS. 1 and 2 can be of metal, plastic, or even paper; backing 30 need not be flame-proof if mat 22 is properly chosen. Thus, a preferred backing is a wicker material, which is available in various decorative patterns. However, the backing can be a nonflammable refractory material, such as carbon, if desired.

Whatever its nature, the means for supporting the mat will include means for affixing the support to the mat; e.g., adhesive or mechanical means. In the embodiment of FIGS. 1-3, adhesive 28 is employed to affix backing 30 to mat 22. Although not required, it is preferred that adhesive 28 be a nonflammable material. Various nonflammable adhesives can be employed, including aluminosilicate, zirconia, and alumina cements, all of which are available in commerce.

If the support means is a backing which itself is relatively impermeable to oxygen, the requirement that the supported mat have an oxygen permeability insufficient to sustain combustion is easily met. If the components of the support means are permeable, on the other hand, the mat must be selected to satisfy the impermeability requirement. In general, the permeability of the mat is an inverse function of its density, or thickness. In the preferred embodiment in which mat 22 is carbon felt and backing 30 is a wicker material, Macco CA-90 Brush Grade Non-Flammable Contact Adhesive, available as Product 10090-10 from SCM Corporation, Wickliffe, Ohio 44092, is very satisfactory to affix the wicker to the mat. In this construction a carbon felt mat which weighs at least about 2 kg per square meter is desirable. Suitable felt is available from Fiber Materials, Inc., Biddeford Industrial Park, Biddeford, Maine 04005.

FIG. 4 illustrates another means for supporting the mat; viz., stiff metal rod 36 encircling the periphery 26 of the mat and affixed thereto. Athough other means can be used, the metal rod is readily affixed mechanically to the mat. The mat can be folded over the rod at the periphery and staples 32 through the mat employed to hold the rod in place. Alternatively, a wire spiral would serve as well.

The supported mat is also provided with means for grasping it by hand and laying it on the flaming vessel. Various knobs, handles, or other instruments can be employed for this purpose. An especially effective means is illustrated by handle 34, affixed to the supported mat and projecting therefrom. Handle 34 is a stiff metal rod embedded between mat 22 and backing 30 as in FIGS. 1-3, or it can be combined with the support means as in FIG. 4. Handle 34 also serves as a means to hang the snuffer in the vicinity of the stove.

It will be evident there are a number of variations other than those specifically illustrated in the drawings which are within the contemplation of this invention.

What is claimed is:

1. A hand-held device to be used as a snuffer or decorative trivet for extinguishing a fire in a vessel comprising a soft, compressible, resilient, nonflammable mat sized to cover the vessel; and means for supporting said mat to provide a substantially flat, flame-contacting mat face, said supported mat having an oxygen permeability insufficient to sustain combustion; together with stiff handle means connected to said supported mat for grasping and laying said supported mat on the vessel, said stiff handle means and said mat supporting means providing a unitary rigid contruction.

2. The snuffer of claim 1 wherein said mat is a textile material selected from the group consisting of felt, cloth or wool made of carbon, graphite, refractory metal oxide, metal, or glass.

3. The snuffer of claim 2 wherein said textile material is carbon felt.

4. The snuffer of claim 1 wherein said supporting means includes a stiff backing affixed to said mat opposite said flame-contacting face.

5. The snuffer of claim 4 wherein said backing is a wicker material.

6. The snuffer of claim 4 wherein said backing is affixed to said mat with adhesive means.

7. The snuffer of claim 6 wherein said adhesive means is nonflammable.

8. The snuffer of claim 7 wherein said adhesive means is selected from aluminosilicate, zirconia, and alumina cements.

9. The snuffer of claim 1 wherein said supporting means comprises a stiff metal rod affixed to said mat and encircling the periphery thereof.

10. The snuffer of claim 1 wherein said grasping means comprises said handle affixed to said supported mat and projecting therefrom.

11. The snuffer of claim 1 wherein said supporting means and said grasping means comprises a single stiff metal rod affixed to said mat, encircling the peripheral thereof, and projecting therefrom.

12. A hand-held device to be used as a snuffer or decorative trivet for extinguishing a fire in a kitchen pan comprising a carbon felt mat having an oxygen permeability insufficient to sustain combustion sized to cover the pan; and a wicker backing affixed to said mat with a contact adhesive to provide a substantially flat, flame-contacting mat surface; together with a stiff metal rod adhered between said mat and said backing and projecting therefrom for grasping and laying said supported mat on the pan, said stiff metal rod and said wicker backing providing a unitary rigid contruction.

13. The snuffer of claim 12 wherein said mat weighs at least about 2 kg per square meter.

14. A method for snuffing a fire in a vessel which comprises providing in the vicinity of the fire a hand-held device which includes a soft, compressible, resilient, nonflammable mat sized to cover the vessel, and means for supporting said mat to provide a substantially flat, flame-contacting mat face, said supported mat having an oxygen permeability insufficient to sustain combustion, together with stiff handle means connected to said supported mat for grasping and laying said supported mat on the pan, said stiff handle means and said mat supporting means providing a unitary rigid construction;

grasping said device; and laying said device on the vessel so as to rest against the periphery thereof and seal oxygen from entering the vessel.

15. The method of claim 14 wherein said mat is a textile material selected from the group consisting of felt, cloth or wool mad of carbon, graphite, refractory metal oxide, metal or glass.

16. The method of claim 15 wherein said textile material is carbon felt which weighs at least about 2 kg per square foot.

17. The method of claim 14 wherein said supporting means includes a stiff backing affixed to said mat opposite said flame-contacting face.

18. The method of claim 17 wherein said backing is affixed to said mat with adhesive means.

19. The method of claim 14 wherein said supporting means comprises a stiff metal rod affixed to said mat and encircling the periphery thereof.

* * * * *